US008099075B2

(12) United States Patent
Rezaiifar et al.

(10) Patent No.: US 8,099,075 B2
(45) Date of Patent: Jan. 17, 2012

(54) METHOD AND APPARATUS FOR SESSION ESTABLISHMENT FOR EMERGENCY VOIP CALLS

(75) Inventors: Ramin Rezaiifar, San Diego, CA (US); Parag Arun Agashe, San Diego, CA (US); Paul E. Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 11/487,240

(22) Filed: Jul. 14, 2006

(65) Prior Publication Data
US 2007/0110071 A1    May 17, 2007

Related U.S. Application Data

(60) Provisional application No. 60/699,566, filed on Jul. 14, 2005.

(51) Int. Cl.
*H04M 11/04* (2006.01)
*H04W 4/00* (2009.01)
*G06F 15/16* (2006.01)

(52) U.S. Cl. .............. 455/404.1; 370/341; 709/228; 709/229

(58) Field of Classification Search ............ 455/404.1; 370/341; 709/229
See application file for complete search history.

(56) References Cited

U.S. PATENT DOCUMENTS

| 6,199,164 B1 * | 3/2001 | Nishimoto et al. ............... 726/2 |
| 2002/0196749 A1 | 12/2002 | Eyuboglu et al. |
| 2003/0135626 A1 * | 7/2003 | Ray et al. ................. 709/228 |
| 2003/0145091 A1 * | 7/2003 | Peng et al. ................. 709/229 |
| 2005/0233727 A1 * | 10/2005 | Poikselka et al. .......... 455/404.2 |

FOREIGN PATENT DOCUMENTS
WO    WO0203718    1/2002

OTHER PUBLICATIONS
International Search Report and Written Opinion—PCT/US2006/027678, International Search Authority—European Patent Office—Nov. 23, 2006.

* cited by examiner

*Primary Examiner* — Kamran Afshar
*Assistant Examiner* — Omoniyi Obayanju
(74) *Attorney, Agent, or Firm* — Rupit M. Patel

(57) ABSTRACT

Embodiments disclosed herein relate to providing session establishment for emergency VoIP (e.g., E911) calls.

30 Claims, 2 Drawing Sheets

METHOD AND APPARATUS FOR SESSION ESTABLISHMENT FOR EMERGENCY VOIP CALLS

CROSS-REFERENCE TO RELATED APPLICATIONS

This application claims benefit under 35 U.S.C. §119(e) from U.S. Provisional Patent application Ser. No. 60/699,566 entitled "SESSION ESTABLISHMENT FOR EMERGENCY VOIP CALLS" and filed Jul. 14, 2005, the entirety of which is hereby incorporated by reference.

BACKGROUND

1. Field

This disclosure relates generally to wireless communications. More specifically, embodiments disclosed herein relate to providing session establishment for emergency VoIP (e.g., E911) calls.

2. Background

Wireless communication systems are widely deployed to provide various types of communications (such as voice and data) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, W-CDMA, TS-CDMA, and other standards.

Voice over Internet Protocols (VoIP) has been introduced to facilitate voice communications using IP over wireless communications networks. There exists a need for establishing emergency VoIP (e.g., E911) calls in a timely fashion.

DETAILED DESCRIPTION

In some wireless communication systems (e.g., an IS-856 type system), a radio session is maintained between an access terminal (AT) and an access network (AN).

The radio session specifies the protocol subtypes and the parameters associated with the protocol subtypes. For example, the radio session may include the session key which is used for authentication/encryption or the parameters that specify how often and when the AT monitors the control channel (CC) when not connected. Therefore, both the AN and AT need to agree upon the same radio session before the AT can provide any service to a user.

A radio session may be addressed by a Unicast Access Terminal Identifier (UATI), which may, for example, be a 128-bit identifier. In some instances, the UATI may be the IP version 6 (IPv6) address of the entity that hosts the session, such as an AN. In other situations, the identifier of the entity that hosts the session may be embedded in the UATI. In general, a UATI may be any routable identifier that can be used to locate a session storage entity. The session storage entity is typically a server with a database that supports the four messages defined by the well-known A13 interface documented in specification A.S0007-A v2.0 (TIA-1878), published by 3GPP2. However, for the purposes of this disclosure, the session storage entity is any entity that can be addressed and configured to allow an AT to pre-configure a session, as will be discussed further below.

Figure 1:
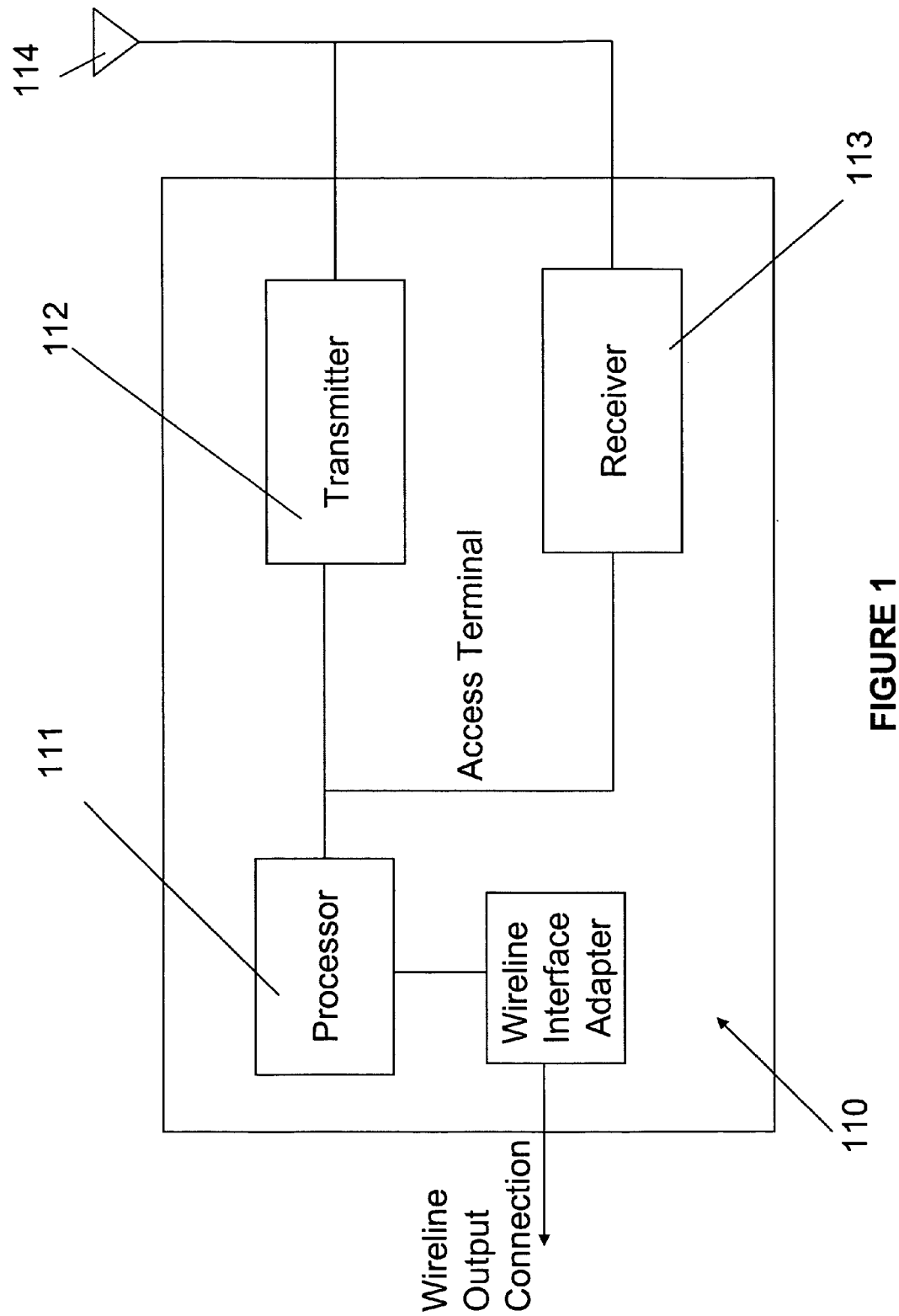
FIG. 1 is a simplified block diagram of an access terminal in accordance with one embodiment of the disclosed method and apparatus.

FIG. 1 is a simplified block diagram of an AT 110 in accordance with one embodiment of the disclosed method and apparatus. The AT 110 includes a programmable processor 111 coupled to a transmitter 112 and a receiver 113. In one embodiment of the disclosed method and apparatus, the transmitter and receiver are both coupled to a single antenna 114. However, it will be understood by those skilled in the art that the AT 110 may be configured with a single transceiver that can both transmit and receive. Alternatively, the AT 110 may have separate transmit and receive antennas, rather than one antenna shared by the transmitter 112 and the receiver 113.

When an AT needs to make an emergency VoIP (e.g., E911) call, it is desirable to bypass session configuration, authentication, key generation, etc., so as to allow the AT to timely access the system (e.g., for E911 purposes). The session required for making emergency VoIP calls is configured at the AT and a session storage entity.

In an embodiment of the disclosed method and apparatus, an AT may configure a session (hereafter referred to as a "pre-configured" session) with a session storage entity in advance, for example, when the AT is first set up. It should be noted that some skilled in the art may refer to "provisioning" rather than "configuring". These terms should be taken to have the same general meaning for the purposes of this disclosure.

Later, when the AT needs to access an AN quickly, for example to make an emergency VoIP (e.g., E911) call, the serving AN may retrieve the pre-configured session from the session storage entity, without going through session configuration exchanges with the AT (such as during a regular connection process). This pre-configured session may contain various applications/protocol/attribute values needed to complete the emergency VoIP call, as further described below.

Figure 2:
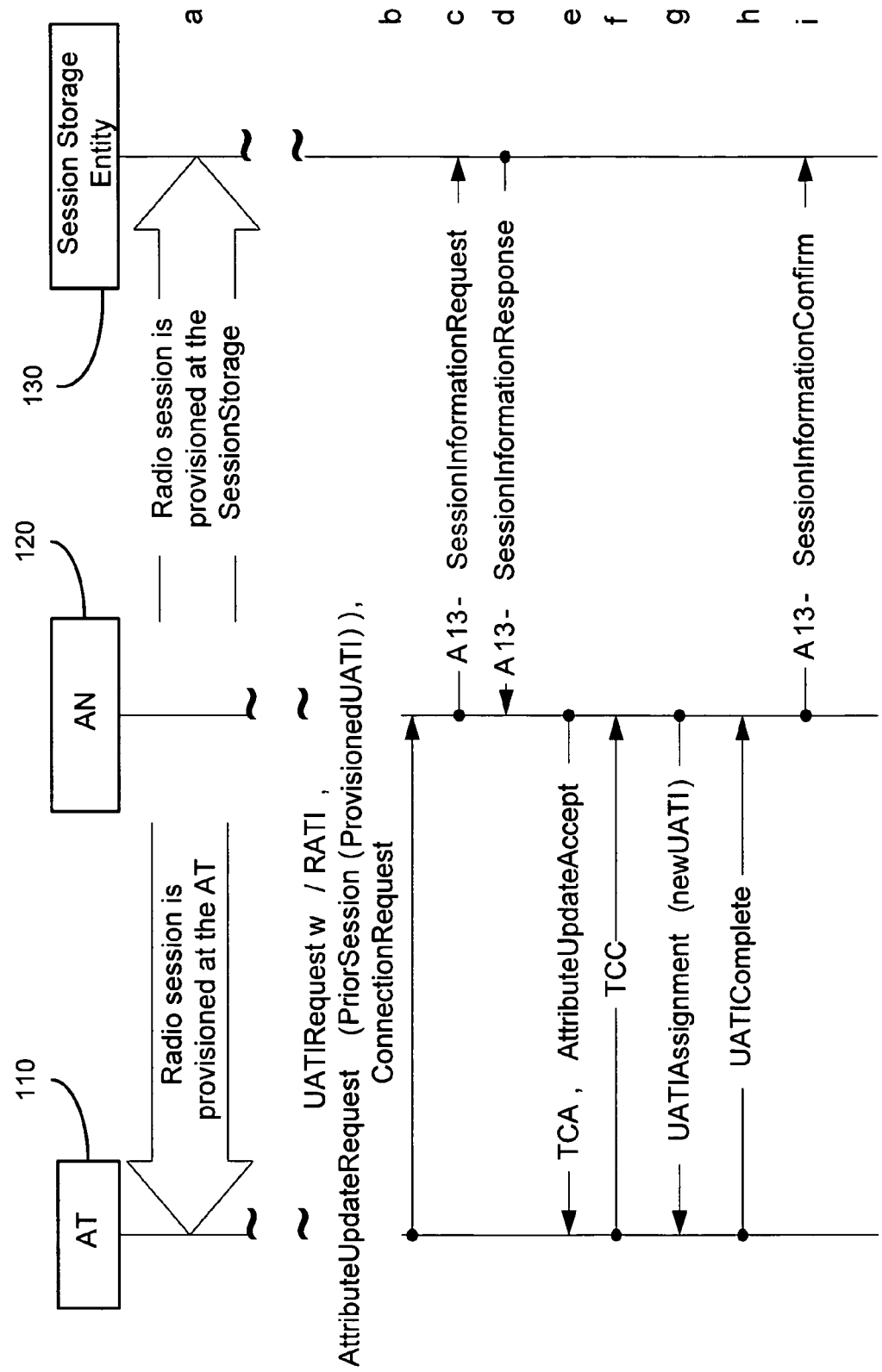
FIG. 2 illustrates a call flow diagram, which may be used in one embodiment of the disclosed method and apparatus to implement session establishment for emergency VoIP calls.

FIG. 2 illustrates a call flow diagram, which may be used in one embodiment of the disclosed method and apparatus to implement session establishment for emergency VoIP calls. At STEP "a", an AT 110 provisions and configures a session with a session storage entity 130, e.g., via an AN 120 (i.e., "pre-configures" the session). Such pre-configuring may take place, for example, when the AT 110 is first set up, or at a predetermined time in advance.

In some embodiments, the pre-configuring may be negotiated via a wireline connection (e.g., via cables, or optic fibers, etc.). In any case, a UATI is assigned to the radio session. That UATI will then be used later to retrieve the radio session from the session storage entity 130. The UATI assigned to the session may be the UATI of the session storage entity itself, which will then allow the AN to contact the session storage entity 130. However, in an alternative embodiment of the disclosed method and apparatus, the UATI is unique to the particular session.

The session storage entity 130 may be a server including a database, which may be configured to support messages defined by some air-interfaces, such as an A13 interface. It should be noted that to other ANs, the session storage entity 130 may appear as another AN. Hence, the A13 interface may be used between the session storage entity 130 and the AN 120, as further described below.

At STEP "b", the processor within the AT 110 generates a message to be sent via the transmitter 112 to the visiting AN 120. That message may include a UATI request (i.e., a request for a local UATI to be assigned to the AT 120 in order to allow communication between the AT 110 and the AN 120). Those skilled in the art will understand that UATIs are typically assigned to allow network entities to communicate with one another. The UATI request may include a random access terminal identifier (RATI) and a connection request, etc. In addition, the message to the visiting AN 120 may include an attribute update request (e.g., PriorSession(ProvisionedUATI)) requesting the AN 120 to retrieve and restore a pre-configured session.

At STEP "c", the AN 120 sends to the session storage entity 130 (e.g., via the A13 interface), a session information request which includes the UATI associated with the radio session that has been pre-configured. In one embodiment of the disclosed method and apparatus, the session information request includes a request for various applications/protocol/attribute values associated with the UATI that was assigned to the pre-configured radio session.

At STEP "d", the session storage entity 130 sends a "session information response" to the visiting AN 120 (e.g., via the A13 interface).

At STEP "e", the AN 120 sends a message to the receiver 113 in the AT 110, which message may include a "traffic channel assignment" (TCA), and an "attribute update accept reply". At STEP "f", the transmitter 112 in the AT 110 sends a "traffic channel control" (TCC) message to the AN 120.

At STEP "g", the receiver 113 in the AT 110 receives a local UATI assignment from the AN 120. It should be understood that the local UATI assigned to the AT 110 is typically different from, and independent of, the UATI that is associated with the radio session to be retrieved from the session storage entity 130.

At STEP "h", the transmitter 112 in the AT 110 sends a UATI complete message to the visiting AN 120.

At STEP "i", the AN 120 sends a session information confirm message to the session storage entity 130. Subsequently, the AT 110 and the AN 120 may use the session thus retrieved, e.g., for connecting the emergency call.

It will be understood by those skilled in the art that each of the communications described above may occur either over the air or over a wireline connection.

When the pre-configured session at the session storage entity 130 changes, the configured session at the AT 110 may also be changed. In one embodiment of the disclosed method and apparatus, the configured session may be changed using the over-the-air messages similar to those provided by service configuration protocol (SCP) and generic attribute update protocol (GAUP) in an IS-856-A type system. Such procedures would indicate to the AT 110 that the attributes provided in this round of configuring may be for the configured E911 session.

A session storage entity disclosed herein may be a server, or other storage means, configured to respond to the session information request.

Various units/modules and embodiments disclosed herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (e.g., processor 111). The memory unit may be implemented within the processor or external to the processor, in which case it can be communicatively coupled to the processor via various means known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communications, comprising:
storing prior to initiating a pre-configured radio session between an access terminal and a communication network, pre-configuration information at a storage entity wherein the pre-configuration information is sufficient to complete the pre-configured radio session, and wherein the pre-configuration information comprises configuration parameters for completing the pre-configured session;
sending from the access terminal to an access network of the communication network a connection request identifying the pre-configured radio session, prior to initiating the pre-configured radio session;
retrieving from the storage entity, prior to initiating the pre-configured radio session, the pre-configuration information for the pre-configured radio session; and
completing the pre-configured radio session between the access terminal and the communication network, through the access network using the retrieved pre-configuration information and bypassing a network session configuration.

2. The method of claim 1, wherein the connection request includes a routable identifier.

3. The method of claim 1, wherein the connection request includes a universal access terminal identifier.

4. The method of claim 1, wherein storing the pre-configuration information for the pre-configured session includes negotiating over a wireline connection.

5. The method of claim 1, wherein the pre-configured radio session comprises an emergency Voice Over Internet Protocol (VOIP) call session.

6. The method of claim 1, wherein sending the request to the access network comprises sending an attribute update request over a wireless link from the access terminal to the access network.

7. The method of claim 1, wherein the radio session identifier comprises a Unicast Access Terminal Identifier (UATI).

8. The method of claim 1, wherein the radio session identifier comprises a random access terminal identifier.

9. The method of claim 1, wherein the pre-configuration information comprises attribute values needed to complete a Voice Over Internet Protocol (VOIP) call.

10. The method of claim 1, wherein completing the pre-configured radio session by retrieving the pre-configuration information permits the access terminal to establish the connection with the access network and bypass an authentication with the access network.

11. The method of claim 1 wherein completing the pre-configured radio session by retrieving the pre-configuration information permits the access terminal to establish the connection with the access network and bypass security key generation with the access network.

12. A method for wireless communications, comprising:
receiving a connection request at an access network of a wireless communication network;
receiving at the access network and prior to initiating a pre-configured radio session between an access terminal and the wireless communication network, a retrieve and restore request identifying a stored pre-configured radio session to retrieve and restore the identified stored pre-configured radio session, wherein the stored pre-configured radio session includes pre-configuration information that comprises configuration parameters for completing the pre-configured radio session connection using the pre-configured radio session;
sending, prior to initiating the pre-configured radio session, an access request from the access network to a session storage entity for accessing the pre-configuration information for the identified preconfigured radio session;
receiving, prior to initiating the pre-configured radio session, the pre-configuration information from the session storage entity; and
sending to the access terminal, prior to initiating the pre-configured radio session between the access terminal and the access network, a routable access terminal identifier to complete the pre-configured radio session between the access terminal and the communication network, through the access network using the received pre-configuration information and bypassing a network session configuration.

13. The method of claim 12, wherein receiving the connection request comprises receiving a request for a local Unicast Access Terminal Identifier (UATI) from the access network.

14. The method of claim 12, wherein receiving the connection request comprises receiving a request having a random access terminal identifier.

15. The method of claim 12, wherein receiving the retrieve and restore request comprises receiving an attribute update request.

16. The method of claim 15, wherein the attribute update request comprises a Unicast Access Terminal Identifier (UATI) for the pre-configured radio session.

17. The method of claim 12, wherein sending to the access terminal the routable identifier comprises sending to the access terminal a local identifier independent of the identifier of the stored pre-configured radio session.

18. An access terminal comprising:
a processor programmed to:
store, prior to initiating a pre-configured radio session between an access terminal and a communication network, pre-configuration information for the pre-configured radio session at a storage entity, wherein the pre-configured radio session has an associated Unicast Access Terminal Identifier (UATI) and the pre-configuration information is sufficient to complete the pre-configured radio session between the access terminal and an access network of the communication network and comprises configuration parameters for completing the pre-configured session; and
generate, prior to initiating the pre-configured radio session between the access terminal and the communication network, a request to connect to an access network to and a request to complete the pre-configured radio session in response to an attempt by a user of the access terminal to establish communications between the access terminal and the access network, the request including said Identifier (UATI) associated with the pre-configured radio session associated with the pre-configuration information;
a transmitter configured to transmit the request to the access network; and
a receiver configured to receive, from the access network, an acknowledgement that a current radio session according to the pre-configured radio session identified by the UATI in the request to complete has been established between the access terminal and the access network using the retrieved pre-configuration information and bypassing network session configuration, and in accordance with a local UATI assignment for the access terminal to use in the current radio session that is distinct from the UATI associated with the pre-configured radio session.

19. The access terminal of claim 18, wherein the processor is further programmed to generate a request for the local access terminal identifier, wherein said request comprises a request for a local UATI from the access network.

20. The access terminal of claim 18, wherein the pre-configured radio session comprises a pre-configured emergency Voice Over Internet Protocol (VOIP) call session.

21. The access terminal of claim 18, wherein the receiver is configured to receive, from the access network, a traffic channel assignment in response to the request to connect to an access network.

22. A method for wireless communications, the method comprising:
   storing, prior to initiating a pre-configured Voice Over Internet Protocol (VOIP) call session between an access terminal and a communication network, pre-configuration information for the pre-configured VOIP call session at a storage entity, wherein the pre-configured VOIP call session has an associated identifier and the pre-configuration information is sufficient to complete the VOIP call session, the pre-configuration information comprising configuration parameters for completing the pre-configured VOIP call session;
   transmitting, prior to initiating the pre-configured VOIP call session between the access terminal and the communication network, a request identifying the pre-configured VOIP call session to an access network of the wireless communication network;
   retrieving in response to the request, prior to initiating the pre-configured VOIP call session, the pre-configuration information for the VOIP call session identified by the request; and
   completing the pre-configured VOIP call session using the retrieved pre-configuration information and bypassing a network session configuration.

23. The method of claim 22, wherein transmitting the request comprises transmitting a Unicast Access Terminal Identifier (UATI) request to the access network including the identifier associated with the pre-configured VOIP session.

24. The method of claim 23, wherein the UATI request includes an attribute update request including the identifier associated with the pre-configured VOIP session.

25. The method of claim 23, wherein the identifier associated with the pre-configured VOIP session comprises UATI assigned to the pre-configured VOIP session.

26. An access terminal comprising:
   means for storing, prior to initiating a pre-configured Voice Over Internet Protocol (VOIP) call session between an access terminal and a communication network, pre-configuration information for the pre-configured VOIP call session at a storage entity, wherein the pre-configured VOIP call session has an associated identifier and is stored to be retrievable using the associated identifier, the pre-configuration information is sufficient to complete the VOIP call session, the pre-configuration information comprising configuration parameters for completing the pre-configured VOIP call session;
   means for transmitting, prior to initiating the pre-configured VOIP call session between the access terminal and the communication network, a request identifying the pre-configured VOIP call session to an access network of the communication network;
   means for retrieving in response to the request, prior to initiating the pre-configured VOIP call session, the pre-configuration information for the VOIP call session identified by the request; and
   means for completing the pre-configured VOIP call session using the retrieved pre-configuration information and bypassing a network session configuration.

27. The access terminal of claim 26, wherein the means for transmitting the request comprises means for transmitting a Unicast Access Terminal Identifier (UATI) request to the access network including the identifier associated with the pre-configured VOIP session.

28. The access terminal of claim 27, wherein the UATI request includes an attribute update request including the identifier associated with the pre-configured VOIP session.

29. The access terminal of claim 27, wherein the identifier associated with the pre-configured VOIP session comprises a UATI assigned to the pre-configured VOIP session.

30. A non-transitory computer-readable medium with computer-readable instructions recorded thereon that, when executed by a processor, are configured to cause the processor to:
   store, prior to initiating a pre-configured Voice Over Internet Protocol (VOIP) call session between an access terminal and a communication network, pre-configuration information for the pre-configured VOIP call session at a storage entity, wherein the pre-configured VOIP call session has an associated identifier and is stored to be retrievable using the associated identifier, the pre-configuration information is sufficient to complete the VOIP call session, the pre-configuration information comprising configuration parameters for completing the pre-configured VOIP call session;
   transmit, prior to initiating the pre-configured VOIP call session between the access terminal and the communication network, a request identifying the pre-configured VOIP call session to an access network of the communication network;
   retrieve in response to the request, prior to initiating the pre-configured VOIP call session, the pre-configuration information for the VOIP call session identified by the request; and
   complete the pre-configured VOIP call session using the retrieved pre-configuration information and bypassing a network session configuration.

* * * * *